United States Patent

[11] 3,568,628

[72] Inventor Lloyd Arthur Erickson
 Niles, Ill.
[21] Appl. No. 782,217
[22] Filed Dec. 9, 1968
[45] Patented Mar. 9, 1971
[73] Assignee Illinois Tool Works Inc.
 Chicago, Ill.

[54] LIQUID LEVEL INDICATOR
 6 Claims, 8 Drawing Figs.
[52] U.S. Cl. .................................................... 116/118,
 73/327, 136/182
[51] Int. Cl. ....................................................... G01f 23/00
[50] Field of Search.......................................... 116/117,
 118; 73/293, 327; 136/181, 182; 350/96

[56] References Cited
 UNITED STATES PATENTS
 2,554,557 5/1951 Brown et al. .................. 73/327
 2,627,748 2/1953 Maybach et al. ............. 73/327
 2,637,209 5/1953 Kendall et al. ................ 73/327

FOREIGN PATENTS
694,125 7/1953 Great Britain ................ 116/118

Primary Examiner—Louis J. Capozi
Attorney—Olson, Trexler, Wolters & Bushnell

ABSTRACT: This invention relates generally to level indicators for indicating levels of liquid subject to fluctuation and more particularly to level indicators of the type comprising a light transmitting member having an upper section provided with a light receiving surface. The embodiment of the invention disclosed herein contemplates a section depending from the above-mentioned upper section into a body of liquid subject to fluctuation within a container, as for example a storage battery. Indicia means of fractional thickness are associated with the above-mentioned light receiving surface and are of a color which is compatible with the shading to which the depending section or portion of the indicator may be subjected when immersed within the liquid of a complementary container. Also, this fractional thickness of indicia material is covered by a thin layer of protective material which is optically compatible with the material from which the indicator is produced.

PATENTED MAR 9 1971

3,568,628

Inventor
Lloyd A. Erickson
By: Olson, Trexler, Wolters & Bushnell  attys

LIQUID LEVEL INDICATOR

DISCLOSURE

It has been found practical in certain instances to provide the light receiving surface of liquid level indicators of the type referred to above with indicia of the type referred to, for the purpose of more clearly apprising the user of the condition of the liquid level within container. It will be apparent that the shade of color to which the depending section of a liquid indicator is subjected within a liquid container will affect the apparent shade or color of the light receiving surface when the depending portion of the indicator is immersed within the body of liquid. As is well known, the immersion of the reflective surface of the depending portion of a liquid level indicator of the type contemplated hereby, prevents reflection of light to the exposed light receiving surface of the indicator. However, when employing indicia, as for example the word "Fill," disclosed herein, it is desirable to have the color of such indicia blend with the color or shade of the associated light receiving surface of the indicator when the depending portion of the indicator is immersed within the liquid body. Thus, the inner walls of a conventional storage battery are dark or substantially black, with the result that the light receiving surface of the indicator will also appear substantially black when the reflective surface of the indicator is immersed. Under such circumstances the use of black pigment for the indicia is preferable. However, if the conditions within the container are such as to produce a different color effect upon the light receiving surface when the indicator is immersed, the color of the indicia must be compatible with the color to which the indicator is subjected within the container.

Liquid level indicators of the type contemplated by the present invention have been produced from methyl methacrylate, sometimes generically referred to as acrylic resin. Common examples of such material are marketed under such trademarks as Lucite, Plexiglas, etc. Such materials, because of their distinctive transparent characteristics are particularly adaptable for use in instances where light is received from an external source to be transmitted to a point within a container and reflected back to the light receiving surface. It is important therefore, in order to obtain a satisfactory bond, that the material or carrier with which the pigment of the indicia is associated be fusibly compatible with the material of which the indicator is manufactured.

The present invention not only contemplates an improved liquid level indicator having the characteristics set forth above, but also an indicator in which the indicia employed are effectively secured against unauthorized detachment from the associated light receiving surface of the indicator. To this end the invention contemplates the use of a novel coating or covering which not only secures the indicia against wear or defacement, but also are irremovably attached to the light receiving surface and will not impair the optical functioning of the indicator.

The foregoing and other objects and advantages of the present invention will be more clearly understood by reference to the accompanying drawing, wherein.

Figure 1:
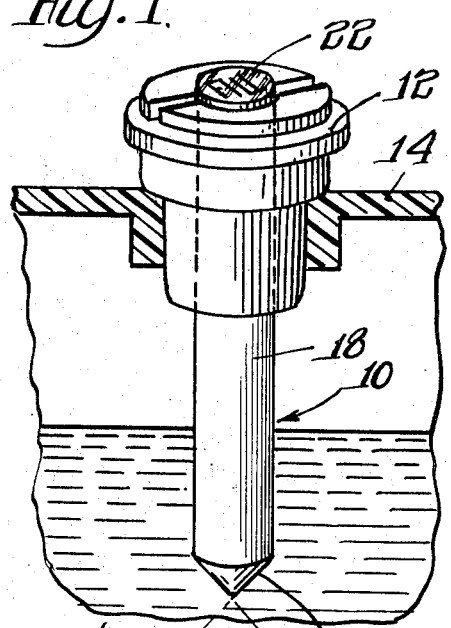
FIG. 1 is a perspective view of a closure cap for a storage battery equipped with a liquid level indicator of the type contemplated by the present invention, an associated storage battery container being shown fragmentarily.

Referring now to the drawing, wherein like numeral have been employed to designate similar parts throughout the various figures, it will be seen that one embodiment of the invention comprises a liquid level indicator designated generally by the numeral 10, shown in association with a battery closure cap 12. In FIG. 1, the closure cap 12 is mounted within the upper wall of a liquid container or storage battery 14. As previously mentioned, liquid level indicators of the type contemplated hereby may be made from methyl methacrylate, generically referred to as an acrylic resin. Such materials have distinctive transparency characteristics which permit light rays received by a surface 16 (FIGS. 5 and 7) to be directed vertically downward through the cylindrical section or shaft 18 to a reflecting conical surface area designated generally by the numeral 20. Light rays received by the conical surface 20 are reflected back to the light receiving surface 16 due to the fact that the included angle of the conical surface 20 is 90 degrees. In other words, downwardly directed light rays received on one side of the conical surface are reflected horizontally to the opposite side and then reflected upwardly to the exposed light receiving surface 16.

Figure 2:
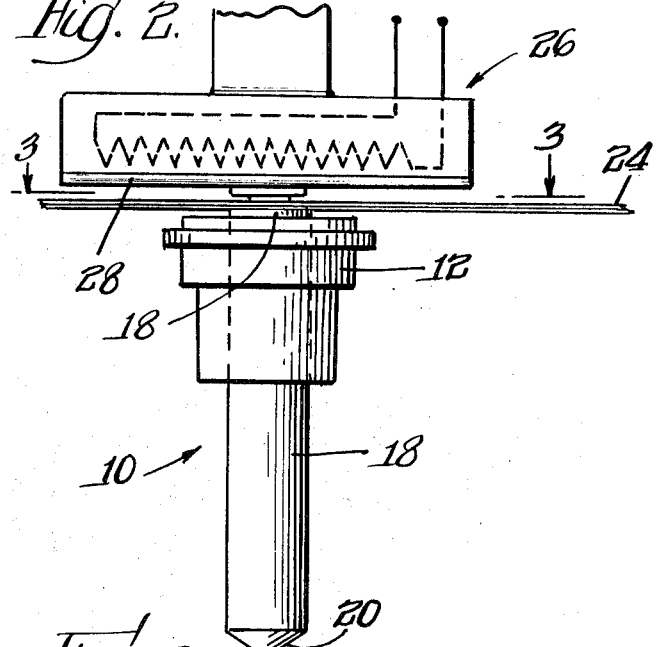
FIG. 2 is a fragmentary side elevational view disclosing a die or hot-stamp device in association with the liquid level indicator of FIG. 1, a strip of transfer tape being operatively interposed between the under side of the die and the upper light receiving surface of the level indicator.
Figure 4:
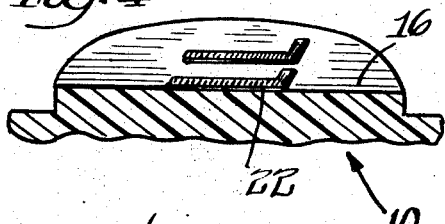
FIG. 4 is an enlarged fragmentary perspective sectional view taken substantially along the line 4—4 of FIG. 3 after the indicia have been applied from the transfer strip to the light receiving surface of the indicator.
Figure 3:
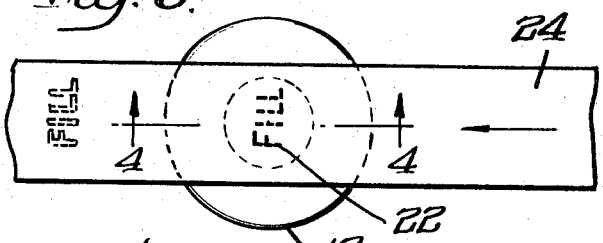
FIG. 3 is a plan view taken substantially along line 3—3 of FIG. 2, more clearly to illustrate the manner in which the indicia of the tape are positioned above the light receiving surface of the level indicator.

Particular attention is directed to the manner in which indicia 22 are applied to the light receiving surface 16. To accomplish this, a strip of conventional transfer material 24 is employed which is positioned over the light receiving surface 16 as shown in FIG. 2. The material 24 usually includes a carrier strip of cellophane, mylar, etc. A suitable hot-stamp device 26 is employed which has an undersection 28 of rubberlike material having embossed thereon the desired indicia, such as the letters F-I-L-L, in the present instance. The application of heat and pressure causes the indicia material of the strip 24 to be transferred to the light receiving surface 16. It has been found practical to employ a stamping temperature which ranges from 350° to 500° F. It is also important to note that the indicia 16 which are made up of the indicia pigment and the carrier, therefore, must be very thin. In fact, it has been found practical to use material having a thickness of approximately .0001. In addition, the carrier for the pigment of the indicia must be fusibly compatible with the material of the indicator so that when the transfer under heat and pressure takes place, the indicia will become properly bonded to the material of the indicator.

Attention is also directed to the fact that the shade of color of the pigment used for the indicia must be compatible with the shade of color to which the depending portion or shaft of the indicator is subjected when it is enclosed within a container such as the storage battery 14. Obviously if the walls of the storage battery 14 are black, then the pigment of the indicia should be black so that when the light reflecting conical surface 20 of the indicator is immersed within the liquid of a container, the light receiving surface 16 will appear to have a uniform dark shade of color blending with the color of the indicia. On the other hand, if the interior of the container is provided with a lighter shade, then the color of the indicia must conform to that shade.

Figure 7:
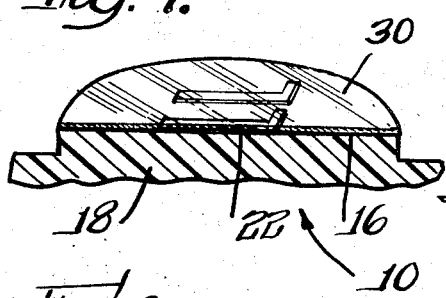
FIG. 7 is an enlarged fragmentary perspective sectional view similar to FIG. 4, showing the protective coating superimposing the previously applied indicia and the remaining portion of the light receiving surface.
Figure 5:
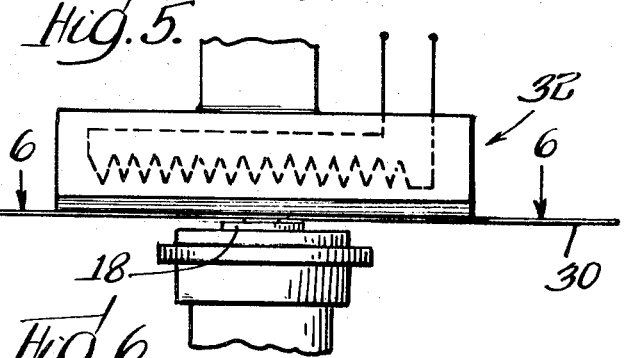
FIG. 5 is a fragmentary elevational view similar to that disclosed in FIG. 2, showing the final covering or protective tape material interposed between a hot-stamp or die and the light receiving surface of the level indicator.
Figure 8:
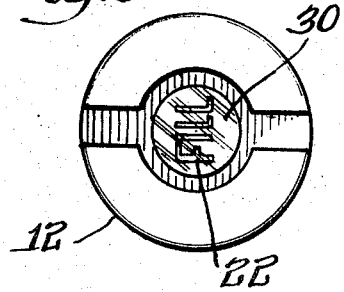
FIG. 8 is an enlarged plan view of the device as shown in FIG. 1.
Figure 6:
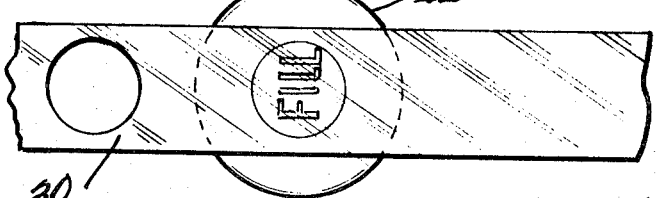
FIG. 6 is a transverse view taken substantially along the line 6—6 of FIG. 5, showing the protective tape material superimposing the previously applied indicia and the remaining exposed portion of the light receiving surface of the indicator.

After the indicia 22 have been fused to he the light receiving surface 16, a portion of a strip 30 of suitable protective covering material is placed over the indicia 22 and the remaining exposed portion of the light receiving surface 16, as shown in FIGS. 5, 6 and 7. A semidiagrammatic illustration of a conventional hot-stamp device 32 similar to the previously mentioned hot-stamp device 26 is employed. The lower portion of the hot-stamp device 32 carries a rubberlike plate member 34 which is adapted to be pressed against the upper surface of the strip 30 as said strip is interposed between the underside of the stamp or die 32 and the upper portion of the level indicator 10. Again, temperatures ranging from 350° to 500°F. may be employed to cause fusion of the material of the strip 30 with the light reflecting surface 16. Obviously the material of the protective strip 30 must be fusibly compatible with the material of the level indicator in order to obtain proper adhesion of the strip material to the exposed area of the light receiving surface 16 and the indicia 22 secured thereto.

In addition to being fusibly compatible with the material of the indicator, it should also be understood that the material 30 must be optically compatible with the material of the indicator. In other words, the presence of the protective coating 30 should not in any way impair the proper functioning of the level indicator to receive light rays and to direct such rays to the conical light reflective surface 20. Thus the material 30 is usually transparent to the same degree as the material of the level indicator and has a corresponding index light refraction.

From the foregoing, it will be apparent that the present invention contemplates a liquid level indicator of the light transmitting type equipped with a novel arrangement of indicia and protective coating therefor. The compatibility in color of the indicia with the shading to which the depending section of the indicator may be subjected when immersed in a liquid is very important. By employing this arrangement of compatible elements, substantial uniformity in shade of color of the combined indicia and light receiving surface is assured. Also, by having the indicia made of extremely thin stock which is fusibly compatible with the material of the indicator, adherence of the indicia to the light receiving surface of the indicator and a smooth surface condition is assured.

By employing protective sheet material, as explained above, which is fusibly and optically compatible with the material of the indicator, unauthorized removal or impairment of the indicia material and the proper functioning of the light reflective characteristics of the indicator are obtained. It is important also, that the protective sheet material, like the indicator material, be resistant to chemical corrosive effects. When used in association with storage batteries, corrosive effect of acids must be resisted. If the indicator is acrylic in nature, than the hot-stamp indicia carrier and protective covering material may be acrylic or styrene or acrylonitrile-butadiene-styrene, and if the indicator is acrylonitrile or styrene, then such protective covering material should be either acrylic or styrene. If the indicator should be made of nylon, then a compatible material such as nylon, may be employed. It is extremely important that the light transmitting or optical function of the indicator material not be impaired by the presence of the indicia carrier and the protective covering or coating therefor.

I claim:

1. A level indicator for indicating levels of liquid subject to fluctuation, including a light transmitting member having an upper section provided with a light receiving surface, a depending section extending downwardly from said upper section, light reflective surface means associated with said depending section adapted to extend within a body of liquid subject to level fluctuations, said light reflective surface means angularly disposed with respect to said upper light receiving surface so as to receive light from and reflect light to said light receiving surface when said light reflective surface means is located above the level of a body of liquid, indicia means of fractional thickness on said light receiving surface, said indicia means comprising a pigment and carrier therefor, the carrier being fusibly compatible with the material of the light transmitting member, a protective covering for the indicia men means and the light receiving surface associated therewith, said covering being fusibly compatible with the material of the light transmitting member, the material of said light transmitting member, indicia means and protective covering having substantially the same index of light refraction, said indicia means having a color which is compatible with the shading to which said depending section may be subjected when immersed in the liquid of a complementary container, whereby to assure substantial uniformity in shade of color of the combined indicia and light receiving surface when said light reflective surface means is immersed in a body of liquid.

2. A level indicator for indicating levels of liquid subject to fluctuation as set forth in claim 1, wherein the indicia thickness and carrier therefor approximates .0001 inches.

3. A level indicator for indicating levels of liquid subject to fluctuation as set forth in claim 1, having in association therewith an indicator support in the nature of a closure device for a container opening.

4. A level indicator for indicating levels of liquid subject to fluctuation as set forth in claim 3, wherein the closure device is generally cylindrical in cross section and adapted to be accommodated by a complementary opening in a conventional storage batter.

5. A level indicator for indicating levels of liquid subject to fluctuation as set forth in claim 1, wherein the light transmitting member is generally cylindrical in cross section and is provided at its lower extremity with a conical reflective surface.

6. A level indicator for indicating levels of liquid subject to fluctuation as set forth in claim 5, wherein the light receiving surface of the upper section of the light transmitting member is flat and substantially circular in shape, having a diameter substantially equal to the diameter of the cylindrical light transmitting member.